DUNCAN MORRISON
72881  Motor for Carriages &c.
PATENTED
DEC 31 1867
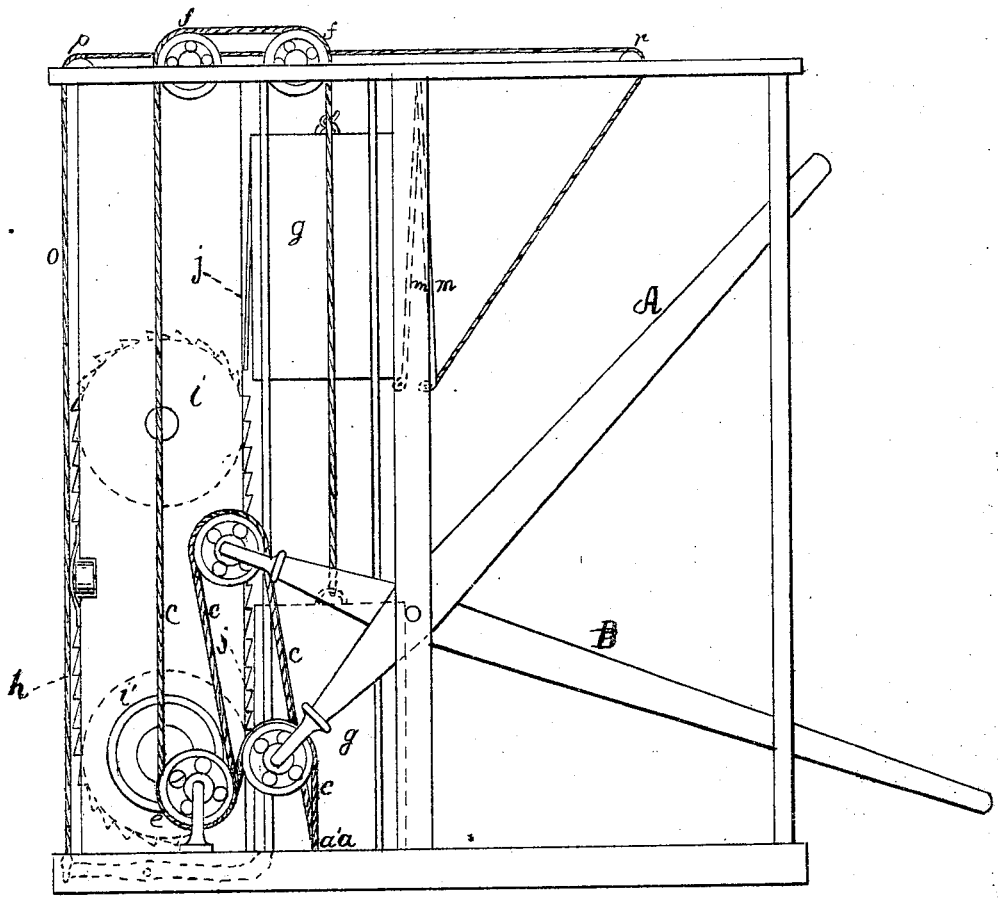
Witness
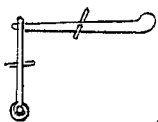
Inventor

United States Patent Office.

DUNCAN MORRISON, OF PORTLAND, MAINE, ASSIGNOR TO HIMSELF AND WILLIAM HAMMOND, OF SAME PLACE.

Letters Patent No. 72,881, dated December 31, 1867.

IMPROVEMENT IN MOTOR FOR CARRIAGES.

*The Schedule referred to in these Letters Patent and making part of the same.*

TO ALL WHOM IT MAY CONCERN:

Be it known that I, DUNCAN MORRISON, of Portland, in the county of Cumberland, and State of Maine, have invented a new and improved Motor for Carriages; and I hereby declare the following to be a full, clear, and exact description thereof, which will enable others to make and use my invention, reference being had to the accompanying drawings forming part of this specification, in which is shown a side view of my invention.

This invention consists of an arrangement of weights and levers, for the purpose of imparting a rotary motion to a shaft, for the purpose of propelling carriages and vehicles, and for other purposes.

A B show two pivoted levers, having trucks, $a\,b$, on their ends. Over these trucks pass cords, $c\,c'$, being attached at $d\,d'$, then under the stationary trucks $e\,e'$, thence over the fixed trucks $f\,f'$, after which they are attached to weights $g\,g'$. Thus, by pressing downward upon the levers A B the weights $g\,g'$ are raised. $h$ shows an apron or belt, passing around the two drums $i\,i'$. The weights $g\,g'$ are made to rise and fall quite close to this belt $h$, and each has a projection, $j$, to catch the teeth or steps on the apron or belt. After the weights are raised, (see $g$,) their being allowed to fall imparts revolution to the drums $i\,i'$, from the last of which motion may be communicated to any desired machinery. By a succession of these weights, a constant revolution may be given to the belt $h$ and the drums $i\,i'$, and while some are descending, others may be raised by their levers, like A B. In order to retain the weights when raised, as $g$, I apply spring-catches, $m$, with hooks on their lower ends, so that when raised, the weights resting upon these hooks or projections are held thus raised until released. $n$ shows a lever, by lifting or pressing upon which the weights are released, and allowed to drop. The lever operates the springs by means of the cord $o$ passing over pulleys $p\,r$, and finally attached to the catches $m$, as shown in the drawing.

My machine is intended to operate as follows: First, raise the weights $g\,g'$. There may, of course, be a succession of these, as numerous as desirable. When raised, each is held by its catch $m$, as described. Then release the weights in succession, at the same time raising those that have descended as fast as they fall. Thus a continuous power may be applied to the belt $h$, and a continuous revolution imparted to the drums or shafts $i\,i'$.

It is evident this invention may be applied to other purposes, as well as that of propelling carriages, such as running sewing-machines, &c. This invention can be easily applied to a sewing-machine for the purpose of imparting motion thereto, and is well adapted for such use.

What I claim as my invention, and desire to secure by Letters Patent, is—

The arrangement of the levers A B, pulleys $a\,b$, cords $c\,c'$, trucks $e\,e'$ and $f\,f'$, weights $g\,g'$, toothed belt $h$, drum $i\,i'$, and the releasing-device, composed of the lever $n$, cord $o$, pulleys $p\,r$, and spring-catches $m$, all as and for the purposes set forth.

DUNCAN MORRISON.

Witnesses:
 WM. H. CLIFFORD,
 HENRY C. HOUSTON.